Patented May 26, 1931

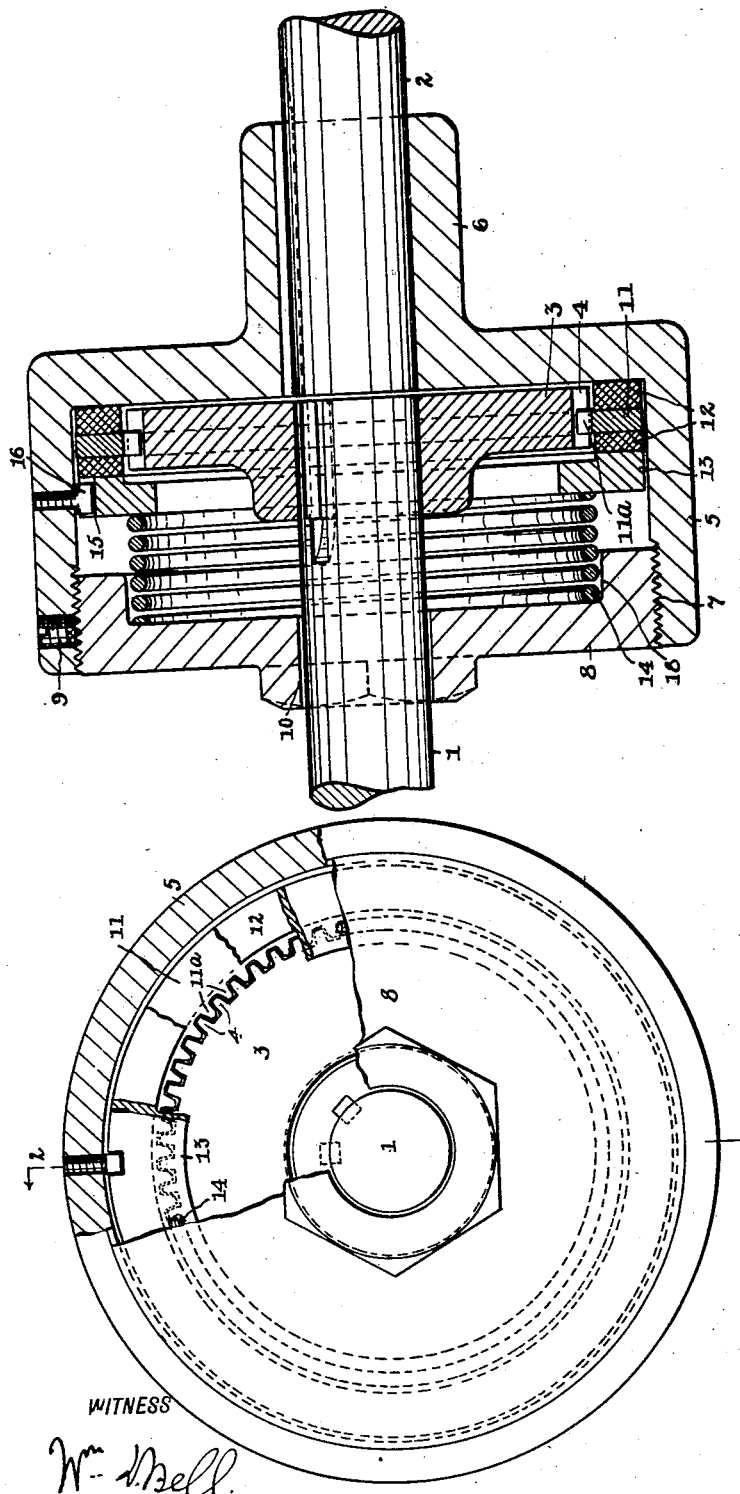

1,807,210

UNITED STATES PATENT OFFICE

FLORENT HINNEKENS, OF PATERSON, NEW JERSEY, ASSIGNOR TO VAN VLAANDEREN MACHINE COMPANY, OF PATERSON, NEW JERSEY, A CORPORATION OF NEW JERSEY

FRICTION COUPLING

Application filed November 4, 1926. Serial No. 146,163.

This invention relates to power-transmitting couplings permitting a gradual pick-up of the load or driven member and it consists in certain improvements in such couplings hereinafter set forth and finally embodied in the appended claims, one principal object being to construct the coupling so that the two main members thereof may assume positions somewhat out of true axial alinement with each other, wherefore in the best form the members have their adjacent portions positively interlocked to rotate together in a manner permitting shifting of one of them to different positions, as with their axes more or less angularly related to each other, one member being an annulus which is held by slip-friction in the body of such member. The invention also contemplates the housing of the actual coupling and other parts and provision for adjustment.

In the drawing,

Fig. 1 is a side elevation of the improved coupling, partly broken away; and

Fig. 2 is a section on line 2—2, Fig. 1.

1 and 2 designates two alined shafts representing the rotary driving and driven elements to be connected by the coupling. The coupling member 3 hereinafter described and also shown as mounted on shaft 1 will usually be the driving one of the two coupling members, so shaft 1 may be taken as the driving element.

On shaft 1 is keyed a gear 3 having external gear teeth 4, and thus forming the mentioned driving one of the two coupling members.

On shaft 2 is mounted the other or driven coupling member constructed as follows: A cylindrical shell 5 open at one end and having its other end closed has a hub 6 projecting from its closed end by which it is keyed or otherwise fixed to the shaft 2. Its open end is internally screw-threaded, as at 7, and therein is screwed the peripherally threaded plate or plug 8, which may be held in place by the set-screw 9; this plate has a central opening 10 of a diameter somewhat exceeding that of shaft 1. Shaft 1 projects through opening 10 into the casing thus formed by the shell and disk and within the casing the gear 3 is contained. In the shell and having internal teeth 11a in mesh with this gear is another gear 11, being preferably an internally toothed flat annulus. Rotation of this gear independently of the shell is resisted frictionally by two annular grip members 12 between which gear 11 is interposed, the three being arranged between the closed end of the casing and a follower ring 13 subject to the pressure of a spiral spring 14 which is interposed between the follower ring and disk or plug 8. The following ring may be held against rotation by providing a notch 15 in its periphery adapted, when the ring is in operative position, to receive a suitable key 16 projecting inward from the peripheral portion of the casing. The spring is kept centered by being partially housed in a deep recess 18 formed in the inner face of the disk or plug 8.

The construction is obviously such that if for any reason the load represented by the driven element is suddenly imposed on the driving element, as if both are at standstill and the driving element is started or both being in rotation braking resistance is applied to the driven element or the speed of the driving element is accelerated or reduced, there will be a slippage of annulus 11 in the coupling member including it.

It is also such that the position of either coupling member may be shifted relatively to the other; thus the elements 1 and 2 or equivalent on which they are mounted need not necessarily be in perfectly true axial alinement but instead may be more or less angularly related to each other which, it will appear, indicates the purpose in forming the opening 10 of greater diameter than shaft 1. This makes the coupling especially desirable as a driving connection between the shaft of a motor and the shaft of some driven means in those cases where each shaft is in effect an extension of the other, in that the motor and driven means do not have to be arranged and kept precisely in such relative positions that the two shafts will be exactly alined with each other so long as their ends coincide.

It will be noted that the annulus is of less thickness than gear 3 and that there is peripheral clearance between them and also between gear 3 and the grip members 12 when, as shown in Fig. 2, the two shafts are exactly alined, thus allowing the two coupling members without binding to assume positions in which their axes are more or less in angular relation to each other.

The frictional pressure exerted on the annulus by what I term the body formed by parts 5, 8, 12, 13 and 14 may be varied by adjusting the abutment formed by disk 8 toward or from the abutment formed by the closed end of the shell.

Having thus fully described my invention what I claim and desire to secure by Letters Patent is:

1. In combination, a pair of rotary shafts having their ends opposed to each other and one being the driving and the other the driven shaft, a gear-like coupling member fixed on one shaft, and a coupling member on the other shaft coactive with the first coupling member and including a casing fixed to said other shaft, said casing housing the first coupling member and having an opening admitting the first shaft and said opening being of greater diameter than said first shaft, a gear in mesh with the first coupling member and rotative independently of the casing, and means, contained in and cooperative with the casing, to exert slip-friction grip on and thus resist rotation of the gear independently of the casing.

2. In combination, rotary driving and driven coupling members, one being a gear and the other including a cylindrical shell concentric with and housing the gear and having an abutment, an abutment adjustable in the shell toward and from the first abutment, a gear concentric with and contained in and rotative independently of the shell and meshing with the first gear, and means, interposed between said abutments, to exert slip-friction grip on the second gear.

3. In combination, rotary driving and driven coupling members, one member including an annulus surrounding the axis of such member and a body in which said annulus is rotative independently thereof and around said axis, said body having means, exerting slip-friction grip on the annulus, to resist rotation thereof independently of said body, and said annulus and the other member being freely shiftable, one relatively to the other, from a position in which their axes are alined to a position in which said axes are angularly related to each other and having tooth means to positively interlock them for rotation together.

4. In combination, rotary driving and driven coupling members, one member including an annulus surrounding the axis of such member, a casing in which said annulus is rotative independently thereof and around said axis and having an opening, the other member loosely projecting through said opening into the casing, and means contained in and cooperative with the casing to exert slip-friction grip on the annulus and thus resist rotation of the annulus independently of the casing and said annulus and the part of said other member contained in the casing being freely shiftable, one relatively to the other, from a position in which their axes are alined to a position in which said axes are angularly related to each other and having tooth means to positively interlock them for rotation together.

In testimony whereof I affix my signature.
FLORENT HINNEKENS.